United States Patent
Huang et al.

(10) Patent No.: US 11,157,698 B2
(45) Date of Patent: Oct. 26, 2021

(54) METHOD OF TRAINING A DESCRIPTIVE TEXT GENERATING MODEL, AND METHOD AND APPARATUS FOR GENERATING DESCRIPTIVE TEXT

(71) Applicant: BEIJING BAIDU NETCOM SCIENCE AND TECHNOLOGY CO., LTD., Beijing (CN)

(72) Inventors: Jizhou Huang, Beijing (CN); Yaming Sun, Beijing (CN); Wei Zhang, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 428 days.

(21) Appl. No.: 16/176,783

(22) Filed: Oct. 31, 2018

(65) Prior Publication Data

US 2019/0384810 A1 Dec. 19, 2019

(30) Foreign Application Priority Data

Jun. 15, 2018 (CN) .......................... 201810622437.7

(51) Int. Cl.
*G06F 40/00* (2020.01)
*G06F 40/295* (2020.01)
(Continued)

(52) U.S. Cl.
CPC .......... *G06F 40/295* (2020.01); *G06F 16/951* (2019.01); *G06F 40/30* (2020.01);
(Continued)

(58) Field of Classification Search
CPC combination set(s) only.
See application file for complete search history.

(56) References Cited

U.S. PATENT DOCUMENTS

2013/0173604 A1* 7/2013 Li .................... G06F 16/3346
707/723
2019/0236139 A1* 8/2019 DeFelice ................. G06F 40/56

FOREIGN PATENT DOCUMENTS

CN 107783960 A 3/2018
CN 107784099 A 3/2018
(Continued)

OTHER PUBLICATIONS

Bahdanau, et al., "Neural Machine Translation By Jointly Learning to Align and Translate", ICLR 2015, Sep. 1, 2014, 16 pages.
(Continued)

*Primary Examiner* — Vu B Hang
(74) *Attorney, Agent, or Firm* — Seed IP Law Group LLP

(57) ABSTRACT

The present disclosure provides a method of training a descriptive text generating model, and a method and apparatus for generating a descriptive text, wherein the method of training a descriptive text generating model comprises: obtaining training data, the training data comprising: a notional word, a first descriptive text and a second descriptive text of the notional word, wherein the second descriptive text is a concise expression of the first descriptive text; regarding the notional word and the first descriptive text of the notional word as input of a seq2seq model, regarding the second descriptive text of the notional word as output of the seq2sequ model, and training the seq2seq model to obtain a descriptive text generating model. The descriptive text generating model according to the present disclosure can implement generation of a concise descriptive text with respect to the notional word in a deep understanding manner.

18 Claims, 10 Drawing Sheets

(51) Int. Cl.
*G06F 16/951* (2019.01)
*G06K 9/00* (2006.01)
*G06K 9/62* (2006.01)
*G06N 7/00* (2006.01)
*G06F 40/30* (2020.01)
*G06F 40/268* (2020.01)
*G06F 40/242* (2020.01)

(52) U.S. Cl.
CPC ..... *G06K 9/00456* (2013.01); *G06K 9/00463* (2013.01); *G06K 9/6256* (2013.01); *G06N 7/005* (2013.01); *G06F 40/242* (2020.01); *G06F 40/268* (2020.01)

(56) References Cited

FOREIGN PATENT DOCUMENTS

| | | |
|---|---|---|
| CN | 107844469 A | 3/2018 |
| CN | 108090070 A | 5/2018 |

OTHER PUBLICATIONS

Baumel, et al., "Query Focused Abstractive Summarization: Incorporating Query Relevance, Multi-Document Coverage, and Summary Length Constraints into seq2seq Models", arxiv.org, Cornell University Library, Jan. 23, 2018, 10 pages.

Chopra, et al., "Abstractive Sentence Summarization with Attentive Recurrent Neural Networks", Proceedings of the 2016 Conference of the North American Chapter of the Association for Computational Linguistics: Human Language Technologies, Jun. 12, 2016, pp. 93-98.

Kim, et al., "Towards Abstraction from Extraction: Multiple Timescale Gated Recurrent Unit for Summarization", Proceedings of the $1^{st}$ Workshop on Representation Learning for NLP, Aug. 11, 2016, pp. 70-77.

Liu, et al., "Table-to-text Generation by Structure-aware Seq2seq Learning", arxiv.org, Cornell University Library, Nov. 27, 2017, 8 pages.

Ma, et al., "A Hierarchical End-to-End Model for Jointly Improving Text Summarization and Sentiment Classification", arxiv.org, Cornell University Library, Jun. 8, 2017, 8 pages.

Ma, et al., "Improving Semantic Relevance for Sequence-to-Sequence Learning of Chinese Social Media Text Summarization", arxiv.org, Cornell University Library, Jun. 8, 2017, 6 pages.

Nallapati, et al., "Abstractive Text Summarization using Sequence-to-Sequence RNNs and Beyond", Proceedings of the $20^{th}$ SignII Conference on Computational Natural Language Learning, Aug. 26, 2016, pp. 280-290.

Rush, et al., "A Neural Attention Model for Sentence Summarization", *Proceedings of the 2015 Conference on Empirical Methods in Natural Language Processing*, Sep. 2015, pp. 279-389.

See, et al., "Get To The Point: Summarization with Pointer-Generator Networks", arxiv.org, Cornell University Library, Apr. 14, 2017, 20 pages.

\* cited by examiner

| | | | |
|---|---|---|---|
| Chinese name | 贝拉克 侯赛因 奥巴马 | Main achievements | remove Bin Laden during his term |
| English name | Barack Hussein Obama | | The 44th US president (the 56th-57th terms) |
| Alias | Barack Obama | | Winner of Nobel peace price of 2009 |
| Nationality | the United States | | Rank the 6th among the most influential 50 figures in global financial field in the fifth session of Bloomberg Market |
| Ethnic group | African American | Masterpiece | Change We Can Believe in, Dreams from My Father, The Audacity of Hope |
| Place of birth | Honolulu, Hawaii | Party | the Democratic Party of the United States |
| Date of birth | August 4, 1961 | Blood type | AB |
| Occupation | lawyer, government official, actor [12] | Height | 185cm[13] |
| Graduate school | Columbia University, Harvard University | Constellation | Leo |
| Religion | Protestant | | |
| Main achievements | Man of the Year of 2008 and 2011 in the magazine Times | | |

Information box

*Fig. 3A*

Baidu Encyclopedia entry the first sentence after colon
in the abstract

Orcinus orca Edit ⊛ ☆ favorites

Orcinus orca is a large-sized toothed whale, 8-10m long, about 9 tons in weight, with a slightly round head and a non-obvious beak; a dorsal fin is high and erect and curves one meter long; the body is black and white. Bones of two wings are spaced apart far. A temporal fossa is large. A lower jawbone is relatively shorter. Each tooth row of the upper and lower jaws includes 10-12 conical teeth. The mouth is thin and long, the teeth are shape, has a ferocious temperament, is a carnivorous animal, and is good at attacking preys and is a natural enemy of penguins and seals. Sometimes, they attach other types of whales, even great white sharks, and are called an overlord of the sea.

Orcinus orca is a highly-socialized animal. A family formed by some groups is the most stable family in the animal kingdom. Orcinus orca's some complicated social behaviors, hunting skills and sound communication are considered as cultural evidences of Orcinus orca himself. Orcinus orcas are distributed in almost all ocean regions, ranging from equator to polar waters. Water temperature or depth does not limit their distribution scope. Their distribution scope extends to many closed or semi-closed sea areas, such as the Mediterranean Sea, the Sea of Okhotsk, the Gulf of California, the Gulf of Mexico, the Red Sea and the Persian Gulf.

| Chinese name | 虎鲸 | Order | Cetacea |
|---|---|---|---|
| Latin name | orcinus orca | Family | delphinidae |
| Alias | orca, killer whale | Genus | Orcinus |
| Kingdom | animalia | Species | orcinus orca |
| Phylum | Chordata | Subspecies | none |
| Subphylum | vertebrata | Name and time | Linnaeus, 1758 |
| Class | mammalia | English name | Killer whale |
| Sub-class | Eutheria | English name | orca |

*Fig. 3B*

METHOD OF TRAINING A DESCRIPTIVE TEXT GENERATING MODEL, AND METHOD AND APPARATUS FOR GENERATING DESCRIPTIVE TEXT

The present application claims the priority of Chinese Patent Application No. 201810622437.7, filed on Jun. 15, 2018, with the title of "Method of training a descriptive text generating model, and method and apparatus for generating descriptive text". The disclosure of the above applications is incorporated herein by reference in its entirety.

FIELD OF THE DISCLOSURE

The present disclosure relates to the technical field of computer application, and particularly to a method of training a descriptive text generating model, and a method and apparatus for generating a descriptive text.

BACKGROUND OF THE DISCLOSURE

In various applications of a search engine, there usually exists a demand to draw a more concise description of a notional word from a source descriptive text of the notional word. The so-called "more concise" means shorter, more accurate and more personalized. For example, if a user inputs a query in the search engine, a search result page corresponding to the query includes relevant entities corresponding to the query, and these relevant entities may be displayed in a right area of the search result page. Nearby (e.g., below) each notional word in the relevant entities there may exist a concise description for the notional word, and the description may be vividly called "entity bright spot". As shown in FIG. 1, when the user input the query "*Raphus cacullatus*", the relevant entity as shown in FIG. 1 may be displayed in the search result page. In the relevant entities, below the notional word "*Equus quagga*" there exists an entity bright spot "already extinct zebra subspecies".

Currently there is not yet a very good method that can implement generation of the above descriptive text in a deep understanding manner.

SUMMARY OF THE DISCLOSURE

In view of the above, the present disclosure provides a method of training a descriptive text generating model, and a method and apparatus for generating a descriptive text, implement generation of a descriptive text with respect to the notional word in a deep understanding manner.

Specific technical solutions are as follows:

In an aspect, the present disclosure further provides a method of training a descriptive text generating model, the method comprising:

obtaining training data, the training data comprising: a notional word, a first descriptive text and a second descriptive text of the notional word, wherein the second descriptive text is a concise expression of the first descriptive text;

regarding the notional word and the first descriptive text of the notional word as input of a seq2seq model, regarding the second descriptive text of the notional word as output of the seq2sequ model, and training the seq2seq model to obtain a descriptive text generating model.

According to a specific implementation mode of the present disclosure, the obtaining the training data comprises:

regarding an encyclopedia entry as an entity name;

extracting the second descriptive text of the entity name from an information box or a first sentence of the abstract of an encyclopedia webpage of the encyclopedia entry;

using the extracted second descriptive text to extract, from a text of the encyclopedia webpage, a sentence that satisfies a preset coverage condition requirement with respect to the second descriptive text as the first descriptive text of the entity name.

According to a specific implementation mode of the present disclosure, the extracting the second descriptive text of the entity name from an information box of an encyclopedia webpage of the encyclopedia entry comprises:

extracting an attribute value from specific information attributes in the information box as the second descriptive text based on a preset rule.

According to a specific implementation mode of the present disclosure, the regarding the notional word and the first descriptive text of the notional word as input of a seq2seq model comprises:

inputting the first descriptive text of the notional word into an encoder of the seq2seq model, and obtaining an implicit vector of the first descriptive text output by the encoder;

inputting a vector representation of the notional word, the implicit vector of the first descriptive text and a preset initial prediction word into a decoder of the seq2seq model.

According to a specific implementation mode of the present disclosure, in the encoder, words included by the first descriptive text of the notional word undergo processing of a bidirectional recurrent neural network RNN, to obtain the implicit vector of the first descriptive text.

According to a specific implementation mode of the present disclosure, in the decoder, use a context vector $c_{t-1}$ at a previous time instant, an implicit vector $s_{t-1}$ at the previous time instant and a prediction word $y_{t-1}$ at the previous time instant to generate an implicit vector $s_t$ and an output vector $o_t$ at a current time instant;

use the vector representation $v_e$ of the notional word, the implicit vector $s_t$ generated at the current time instant and the implicit vector of the first descriptive text to perform processing of an attention mechanism to obtain a context vector $c_t$ at the current time instant;

use the $o_t$ and the $c_t$ to perform first normalized index function Softmax processing to obtain a first prediction probability distribution at the current time instant, and/or, use the attention mechanism to perform second Softmax processing to obtain a second prediction probability distribution at the current time instant;

use the first prediction probability distribution and/or second prediction probability distribution to obtain a prediction word $y_t$ at the current time instant;

obtain prediction words at all time instants cyclically in turn until a preset terminator is obtained, the prediction words at all time instants obtained by prediction forming the second descriptive text.

According to a specific implementation mode of the present disclosure, the using the vector representation $v_e$ of the notional word, the implicit vector $s_t$ generated at the current time instant and the implicit vector of the first descriptive text to perform processing of an attention mechanism comprises:

using the vector representation $v_e$ of the notional word and the implicit vector $s_t$ generated by the decoder at the current time instant to generate a new implicit vector $s_{et}$ at the current time instant, and using the $s_{et}$ and the implicit vector of the first description text to perform the processing of the attention mechanism.

According to a specific implementation mode of the present disclosure, the using the $o_t$ and the $c_t$ to perform first normalized index function Softmax processing to obtain a first prediction probability distribution at the current time instant comprises:

using the $o_t$ and the $c_t$ to generate a probability distribution of words included by a predefined word list as the first prediction probability distribution at the current time instant.

According to a specific implementation mode of the present disclosure, the using the attention mechanism to perform second Softmax processing to obtain a second prediction probability distribution at the current time instant comprises:

using a result of the attention mechanism to generate a probability distribution of words included by the first descriptive text as the second prediction probability distribution at the current time instant.

According to a specific implementation mode of the present disclosure, the using the first prediction probability distribution and/or second prediction probability distribution to obtain a prediction word $y_t$ at the current time instant comprises:

selecting one probability distribution from the first prediction probability distribution and second prediction probability distribution according to the $s_t$, and selecting a word with a maximum probability value from the selected probability distribution as the prediction word $y_t$ at the current time instant; or, combining the first prediction probability distribution and second prediction probability distribution to obtain a new probability distribution, and selecting a word with a maximum probability value from the new probability distribution as the prediction word $y_t$ at the current time instant.

In another aspect, the present disclosure further provides a method of automatically generating a descriptive text, the method comprising:

obtaining a notional word and a first descriptive text of the notional word;

inputting the notional word and the first descriptive text of the notional word into a descriptive text generating model, and obtaining a second descriptive text output by the descriptive text generating model;

wherein the descriptive text generating model is obtained by pre-training with the above method.

According to a specific implementation mode of the present disclosure, the notional word, as a relevant entity of a query input into a search engine, is displayed in a search result page of the query, and the second descriptive text is displayed nearby the relevant entity.

In a further aspect, the present disclosure further provides an apparatus for training a descriptive text generating model, the apparatus comprising:

a first obtaining unit configured to obtain training data, the training data comprising: a notional word, a first descriptive text and a second descriptive text of the notional word, wherein the second descriptive text is a concise expression of the first descriptive text;

a model training unit configured to regard the notional word and the first descriptive text of the notional word as input of a seq2seq model, regard the second descriptive text of the notional word as output of the seq2sequ model, and train the seq2seq model to obtain the descriptive text generating model.

According to a specific implementation mode of the present disclosure, the first obtaining unit is specifically configured to:

regard an encyclopedia entry as an entity name;

extract the second descriptive text of the entity name from an information box or a first sentence of the abstract of an encyclopedia webpage of the encyclopedia entry;

use the extracted second descriptive text to extract, from a text of the encyclopedia webpage, a sentence that satisfies a preset coverage condition requirement with respect to the second descriptive text as the first descriptive text of the entity name.

According to a specific implementation mode of the present disclosure, the model training unit is specifically configured to:

input the first descriptive text of the notional word into an encoder of the seq2seq model, and obtain an implicit vector of the first descriptive text output by the encoder;

input a vector representation of the notional word, the implicit vector of the first descriptive text and a preset initial prediction word into a decoder of the seq2seq model.

According to a specific implementation mode of the present disclosure, the model training unit is specifically configured to:

in the decoder, use a context vector $c_{t-1}$ at a previous time instant, an implicit vector $s_{t-1}$ at the previous time instant and a prediction word $y_{t-1}$ at the previous time instant to generate an implicit vector $s_t$ and an output vector $o_t$ at a current time instant;

use the vector representation $v_e$ of the notional word, the implicit vector $s_t$ generated at the current time instant and the implicit vector of the first descriptive text to perform processing of an attention mechanism to obtain a context vector $c_t$ at the current time instant;

use the $o_t$ and the $c_t$ to perform first normalized index function Softmax processing to obtain a first prediction probability distribution at the current time instant, and/or, use the attention mechanism to perform second Softmax processing to obtain a second prediction probability distribution at the current time instant;

use the first prediction probability distribution and/or second prediction probability distribution to obtain the prediction word $y_t$ at the current time instant;

obtain prediction words at all time instants cyclically in turn until a preset terminator is obtained, the prediction words at all time instants obtained by prediction forming the second descriptive text.

According to a specific implementation mode of the present disclosure, upon using the first prediction probability distribution and/or second prediction probability distribution to obtain the prediction word $y_t$ at the current time instant, the model training unit specifically performs:

selecting one probability distribution from the first prediction probability distribution and second prediction probability distribution according to the $s_t$, and selecting a word with a maximum probability value from the selected probability distribution as the prediction word $y_t$ at the current time instant; or combining the first prediction probability distribution and second prediction probability distribution to obtain a new probability distribution, and selecting a word with a maximum probability value from the new probability distribution as the prediction word $y_t$ at the current time instant.

In a further aspect, the present disclosure further provides an apparatus for automatically generating a descriptive text, the apparatus comprising:

a second obtaining unit configured to obtain a notional word and a first descriptive text of the notional word;

a text generating unit configured to input the notional word and the first descriptive text of the notional word into a descriptive text generating model, and obtain the second descriptive text output by the descriptive text generating model;

wherein the descriptive text generating model is obtained by pre-training with the above apparatus.

The present disclosure further provides a device, the device comprising:

one or more processors;

a storage for storing one or more programs;

the one or more programs, when executed by said one or more processors, enable said one or more processors to implement the above-mentioned method.

The present disclosure further provides a storage medium including computer executable instructions, wherein the computer executable instructions, when executed by a computer processor, implement the abovementioned method.

As can be seen from the above technical solutions, in the present disclosure, generation of the descriptive text is implemented based on the seq2seq model, the seq2seq model learns a generation manner of the second description text from the training data in a deep learning manner, and the descriptive text generating model obtained by training based on this manner can implement generation of the concise descriptive text with respect to the notional word in a deep understanding manner.

BRIEF DESCRIPTION OF DRAWINGS

FIG. 3A is a screenshot of an encyclopedia webpage according to an embodiment of the present disclosure;

FIG. 3B is a screenshot of another encyclopedia webpage according to an embodiment of the present disclosure;

DETAILED DESCRIPTION OF PREFERRED EMBODIMENTS

The present disclosure will be described in detail in conjunction with figures and specific embodiments to make objectives, technical solutions and advantages of the present disclosure more apparent.

In embodiments of the present disclosure, the source descriptive text of the notional word is called a first description text, and a more concise descriptive text generated is called a second descriptive text, i.e., the second descriptive text is a concise expression of the first descriptive text. Using the first descriptive text of the notational word to generate the second descriptive text usually needs to achieve the following points:

1) find an important word from the first descriptive text. First, words in the first descriptive text have different important degrees, and a word important for the notional word needs to be extracted from the words to generate the second descriptive text.

2) find peculiar words for this notional word from the source descriptive text. These words might be high-frequency words or low-frequency words.

3) Use determined words to generate a smooth descriptive text, and the generated second descriptive text is related to the notional word.

At present, methods of generating a text abstract may be divided into extract-type abstract and abstract-type abstract. The draw-type abstract is an abstract formed by extracting important sentences or phrases from the original text, and concatenating them. It is impossible to generate words not appearing in the source text from the extract-type abstract. The abstract-type abstract puts more efforts in the deep understanding of the source text and the text generation. Therefore, the present disclosure employs the abstract-type abstract, and specifically achieves the training of the descriptive text generating model and generation of the descriptive text based on the seq2sequ model.

The method according to the present disclosure mainly comprises implementation in two phases: the first phase is a model training phase, and the second phase is a generation phase of the descriptive text. The method in the two phases is described in detail in conjunction with embodiments.

Figure 2:
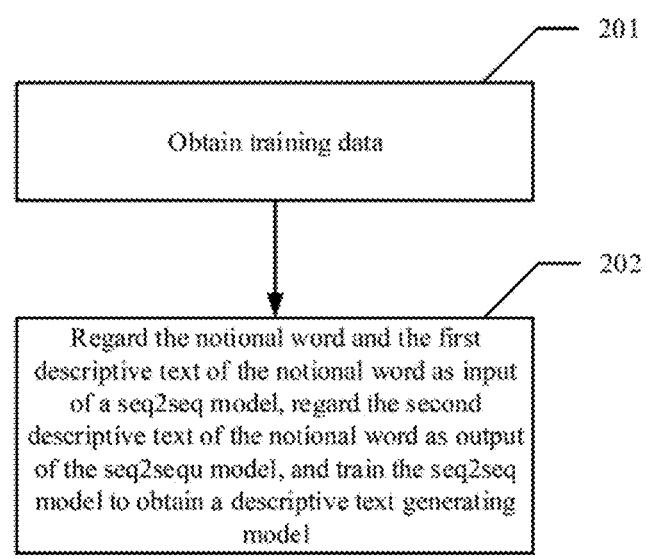
FIG. 2 is a flow chart of a method of training a descriptive text generating model according to an embodiment of the present disclosure.

FIG. 2 is a flow chart of a method of training a descriptive text generating model according to an embodiment of the present disclosure. As shown in FIG. 2, the method may comprise the following steps:

At 201, obtain training data.

The training data comprise a notional word, the first descriptive text and second descriptive text of the notional word.

As an implementation mode, it is feasible to pre-obtain the notional word and the first descriptive text of the notional word, and then manually annotate the second descriptive text.

However, the above-mentioned manner consumes much manpower. Here a preferred implementation mode is provided to achieve automatic obtainment of a training sample: use an encyclopedia webpage to automatically obtain the training sample. Specifically, this may comprise the following steps:

Step S1: regard an encyclopedia entry as an entity name. For example, an encyclopedia entry "*Orcinus orca*" can be regarded as an entity name in the training data.

Step S2: extract the second descriptive text of the entity name from an information box or a first sentence of the abstract of the encyclopedia webpage of the encyclopedia entry. Specifically, it is possible to extract an attribute value from specific information attributes in the information box as the second descriptive text based on a preset rule. It is also possible to regard the first sentence after colon ":" in the first sentence of the abstract, as the second descriptive text.

For example, an information box as shown in FIG. 3A exists in the encyclopedia webpage of the encyclopedia entry "Obama". It is possible to regard an attribute value "the 44$^{th}$ US president" in attributes in its "main achievements" as the second descriptive text of the entity "Obama" according to the preset rule.

Again for example, an abstract portion as shown in FIG. 3B exists in the webpage of the encyclopedia entry "*Orcinus orca*", wherein the first sentence "is a large-sized toothed whale" after colon in the abstract as the second descriptive text of the notational word "*Orcinus orca*".

Step S3: use the extracted second descriptive text to extract, from a text of the encyclopedia webpage, a sentence that satisfies a preset coverage condition requirement with respect to the second descriptive text as the first descriptive text of the entity name.

For example, in the text of the encyclopedia webpage of "Obama", there exists a sentence "already certain to be elected as the 44$^{th}$ (the 56$^{th}$-term) US president, and become the first African-American present in the US history". The coverage rate of the sentence for "the 44$^{th}$ US president" exceeds 80%, and this sentence may be regarded as the first descriptive text of the notional word "Obama".

In the above training sample, at the ending of each second descriptive text is provided a preset terminator which serves as an ending of word prediction during model training.

Figure 1:
FIG. 1 is a diagram of an example of a bright spot in a search result page.

The training of the descriptive text generating model begins after a certain scale of training data is obtained in this manner. Further referring to FIG. 1, at 202, it is feasible to regard the notional word and the first descriptive text of the notional word as input of a seq2seq model, regard the second descriptive text of the notional word as output of the seq2sequ model, and train the seq2seq model to obtain the descriptive text generating model.

The seq2seq model mainly comprises two portions: an encoder and a decoder, wherein the encoder is used to build a model for the input first descriptive text and obtain a series of implicit vectors, and the decoder is used to generate a prediction word sequence according to the implicit vectors and thereby constitute the second descriptive text.

Figure 4:
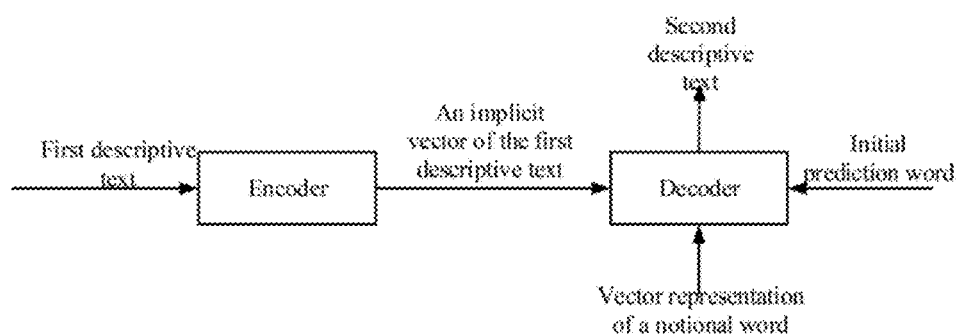
FIG. 4 is a schematic diagram of a seq2seq model according to an embodiment of the present disclosure.

In the embodiments of the present disclosure, as shown in FIG. 4, it is feasible to input the first descriptive text of the notional word into the encoder of the seq2seq model, and obtain the implicit vector of the first descriptive text output by the encoder. A vector representation of the notional word, the implicit vector of the first descriptive text and a preset initial prediction word are input the decoder of the seq2sequ model.

Specifically, in the encoder, words included by the first descriptive text of the notional word may undergo processing of a bidirectional recurrent neural network RNN, to obtain the implicit vector of the first descriptive text. If the first descriptive text includes M words, it is may be obtained through the encoder that the implicit vector of the first descriptive text is comprised of $(h_1, h_2, \ldots, h_M)$. The present disclosure uses the structure of the encoder in the current seq2seq model.

Figure 5A:
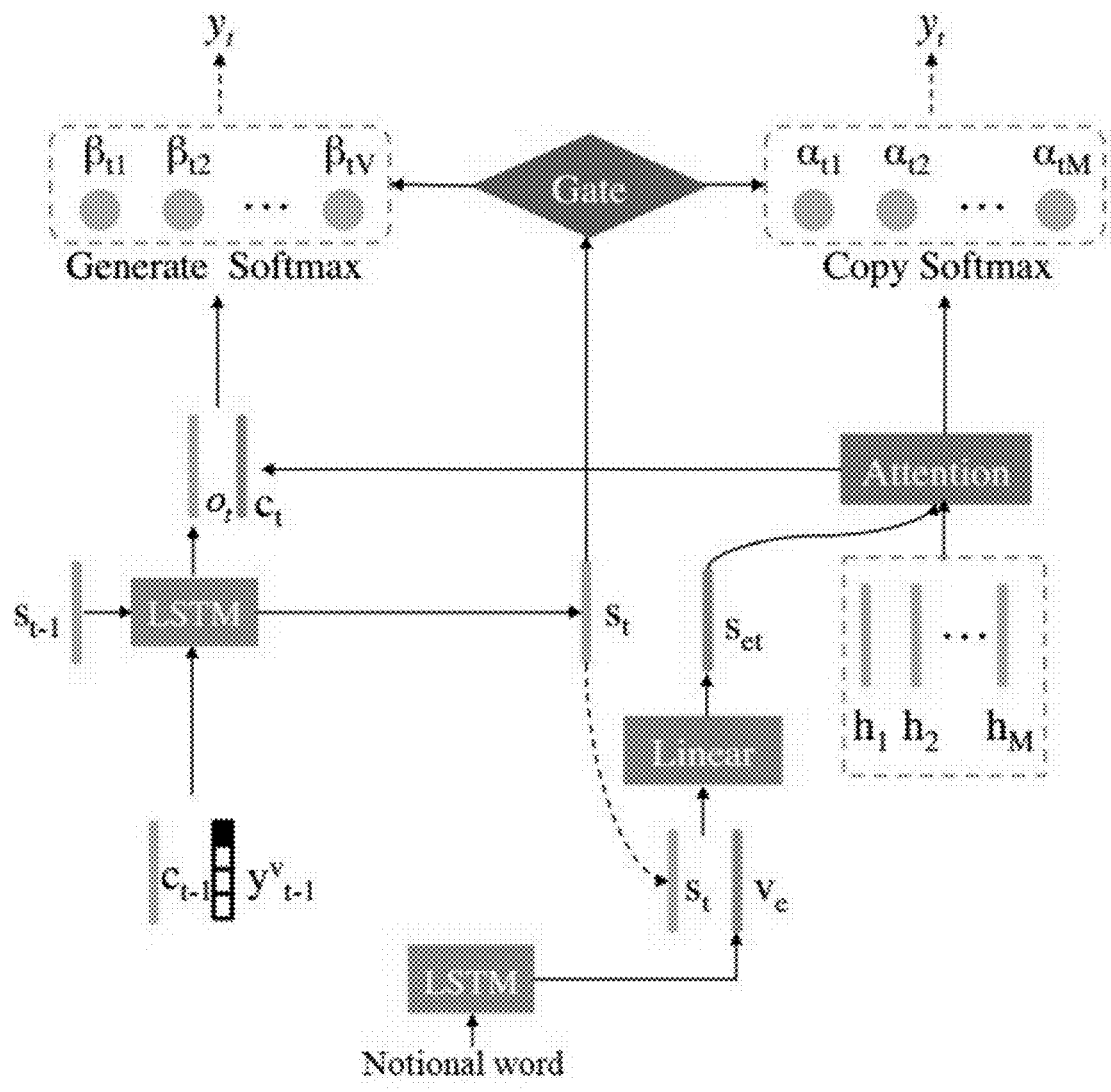
FIG. 5A is a schematic diagram of a decoder of the seq2seq model according to an embodiment of the present disclosure.

The present disclosure improves the structure of the encoder in the seq2seq model and provides an enhanced decoder. A structure of the decoder is described in detail below with reference to FIG. 5A.

In the decoder, a context vector $c_{t-1}$ at a previous time instant, an implicit vector $s_{t-1}$ at the previous time instant and a prediction word $y_{t-1}$ at the previous time instant are used to generate implicit vectors $s_t$ and $o_t$ at a current time instant, represented as:

$$s_t = f(s_{t-1}, y_{t-1}, c_{t-1}) \tag{1}$$

where the last implicit vector output by the encoder is regarded as an implicit vector at an initial time instant of the decoder. The initial prediction word may employ a preset word.

The vector representation $v_e$ of the notional word, the implicit vector $s_t$ generated at the current time instant and the implicit vector of the first descriptive text output by an encoding unit are used to perform processing of an attention mechanism to obtain the context vector $c_t$ at the current time instant.

Specifically, it is possible to use the vector representation $v_e$ of the notional word and the implicit vector $s_t$ generated by the decoder at the current time instant to generate a new implicit vector $s_{et}$ at the current time instant:

$$s_{et} = \text{linear}([v_e; s_t]) \tag{2}$$

where linear represents linear transformation.

Then use $s_{et}$ to perform the processing of the attention mechanism for the implicit vector of the first descriptive text output by the encoding unit, which for example may be represented as:

$$c_t = \sum_{j=1}^{M} \alpha_{tj} h_j \tag{3}$$

where $\alpha_{tj}$ is a weight, and represents attention placed on the j$^{th}$ implicit vector of the encoding unit at the decoding time instant t, and its calculation manner may be for example:

$$\alpha_{tj} = \frac{\exp(e_{tj})}{\sum_{k=1}^{M} \exp(e_{tk})} \tag{4}$$

$$e_{tj} = v^T \tanh(W h_j + U s_{et} + w_{cov} \text{cov}_t + b_{attn}) \tag{5}$$

Where v, W, U, $w_{cov}$ and $b_{attn}$ all are model parameters, $\text{cov}_t$ is a coverage vector, and it is a sum of all previous attention distributions during the decoding process $$\text{cov}_t = \sum_{t'=0}^{t-1} \alpha_{t'} \tag{6}$$

Then, it is feasible to use $o_t$ and $c_t$ to perform first normalized index function Softmax (Generate Softmax) processing to obtain a first prediction probability distribution at the current time instant, and/or, use the attention mechanism to perform second Softmax (Copy Softmax) processing to obtain a second prediction probability distribution at the current time instant. It is possible to use the first prediction probability distribution and/or second prediction probability distribution to obtain a prediction word $y_t$ at the current time instant.

Upon Generate Softmax processing, $o_t$ and $c_t$ may be used to generate a probability distribution of words included by a predefined word list as the first prediction probability distribution at the current time instant. Upon copy Softmax processing, a result of the attention mechanism may be used to generate a probability distribution of words included by the first descriptive text as the second prediction probability distribution at the current time instant.

If only one of Generate Softmax and Copy Softmax is performed, the first prediction probability distribution or second prediction probability distribution obtained by performing Generate Softmax or Copy Softmax may be used, and a word with a maximum probability value therein is directly regarded as the prediction word at the current time instant.

If Generate Softmax and Copy Softmax are both performed, the prediction word at the current time instant may be determined in, but not limited to the following two manners:

The first manner: selecting one probability distribution from the first prediction probability distribution and second prediction probability distribution according to $s_t$, and selecting a word with a maximum probability value from the selected probability distribution as the prediction word $y_t$ at the current time instant.

Specifically, in the figure, gate generates one 0 or 1 value, and a calculating manner of its generated value $y_{gt}$ is as follows:

$$y_{gt}=\arg\max \text{soft max}(\text{linear}(s_t)) \quad (7)$$

When the value of $y_{gt}$ is 1, the prediction word $y_t$ at the current time instant may be generated according to the second prediction probability distribution, namely, select one word from the first descriptive text according to the probability distribution generated by copy softmax. When the value of $y_{gt}$ is 0, the prediction word $y_t$ at the current time instant may be generated according to the first prediction probability distribution, namely, select one word from the preset word list according to the probability distribution generated according to generate softmax.

The second manner is: combining the first prediction probability distribution and second prediction probability distribution to obtain a new probability distribution, and selecting a word with a maximum probability value from the new probability distribution as the prediction word $y_t$ at the current time instant.

Figure 5B:
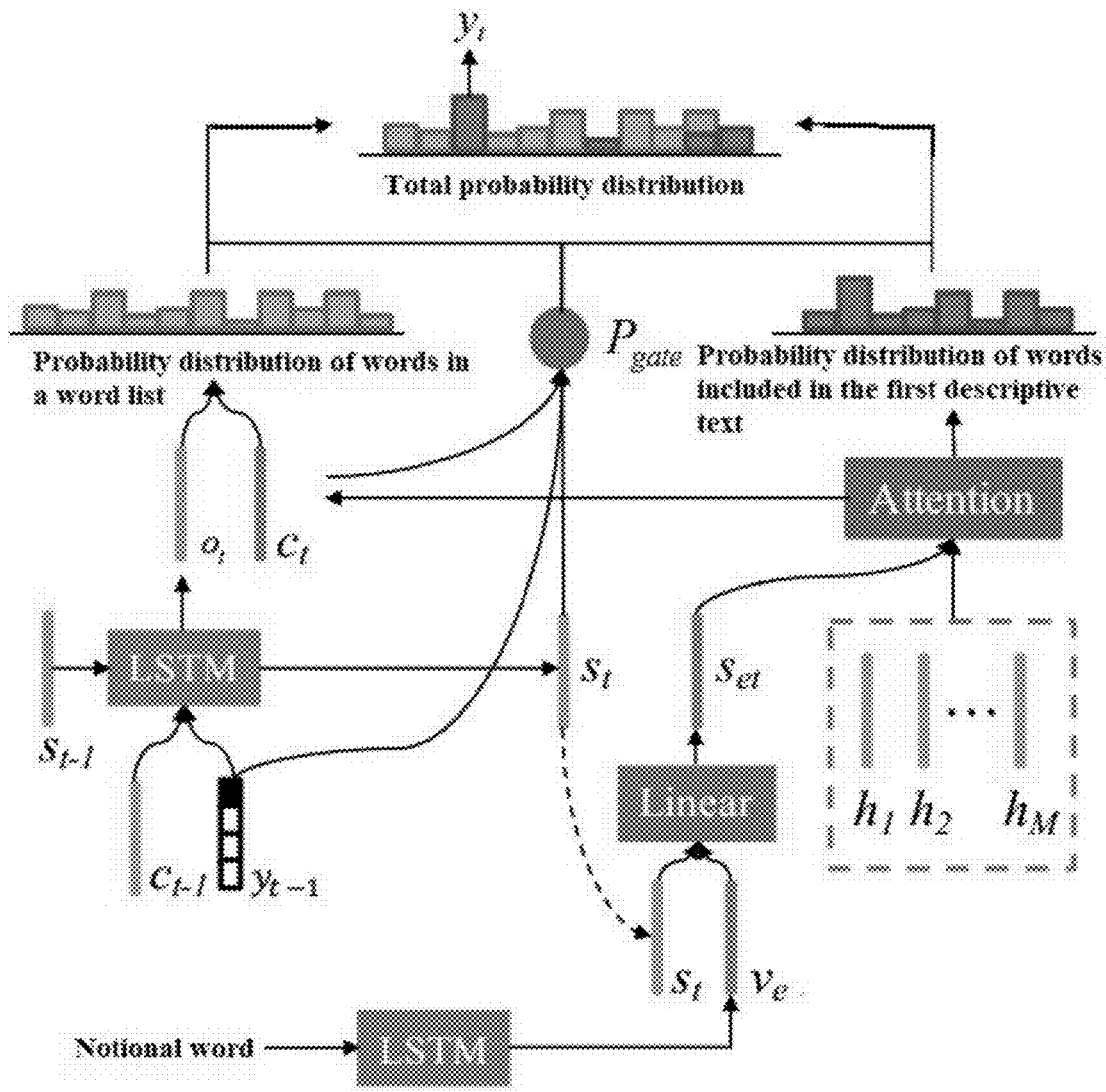
FIG. 5B is another schematic diagram of a decoder of the seq2seq model according to an embodiment of the present disclosure.

Specifically, in the figure, a value generated by gate is a probability. As shown in FIG. 5B, a calculating manner of its generated probability is as follows:

$$P_{gate}=\sigma(w_c^T c_t + w_s^T s_t + w_y^T v_t^y + b) \quad (8)$$

where, $\sigma$ is a sigmoid function, $w_c$, $w_s$, $w_y$ and b are model parameters, and $v_t^y$ is a word vector of the prediction word input into the decoding unit at the current time instant.

It is possible to, according to an output probability $P_{gate}$ of gate, combine a probability distribution $P_{generate}$ generated by generate softmax and a probability distribution obtained by copy softmax to obtain a total probability distribution P(w), namely, a calculating equation is as follows:

$$P(w)=P_{gate}P_{generate}(w)+(1-P_{gate})\Sigma_{j:w_j=w}\alpha_{tj} \quad (9)$$

where $P_{generate}$=soft max(linear([$o_t$;$c_t$]))

If the word w is not a word in the preset word list, $P_{generate}$ is 0. If the word w is not a word in the first descriptive text, a value of $\Sigma_{j:w_j=w}\alpha_{tj}$ ($\Sigma_{j:w_j=w}\alpha_{tj}$ is a probability output by copy softmax for w) is 0. The decoder calculates to obtain a corresponding P(w) respectively with respect to the preset word list and each of words included by the first descriptive word, and determines which word is output according to P(w), namely, outputs a word with a maximum P(w) as the prediction word at the current time instant.

Prediction words at all time instants are obtained cyclically in turn in the above manner until a preset terminator is obtained. The prediction words at time instants obtained by prediction constitute a prediction text corresponding to the first descriptive text. During training, a training target of the seq2seq model is to minimize a difference between the prediction text corresponding to the first descriptive text and the corresponding second descriptive text in the sample.

This may be embodied as minimizing a preset loss function. For example, the loss function may be:

The loss function $Loss_t$ of the model training is defined as follows:

$$Loss_t=-\log P(w^*_t)+\lambda\Sigma_{j=1}^M \min(\alpha_{tj},cov_t)$$

where $w^*_t$ is a target prediction word at a time instant t, and $\lambda$ is a preset parameter value.

After completion of the above training, the obtained seq2seq model serves as a descriptive text generating model. The descriptive text generating model is used to output the second descriptive text of the notional word after the notional word and the first descriptive word of the notional word are input.

Figure 6:
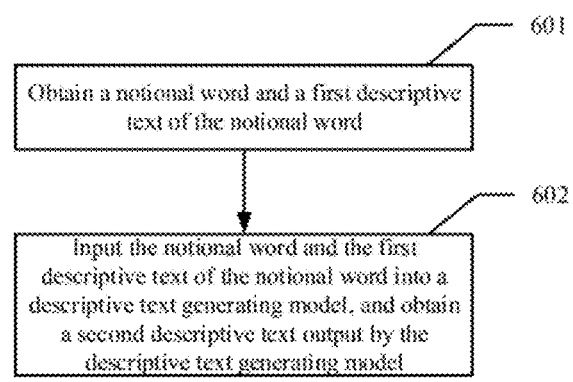
FIG. 6 is a flow chart of a method of automatically generating a descriptive text according to an embodiment of the present disclosure.

FIG. 6 is a flow chart of a method of automatically generating a descriptive text according to an embodiment of the present disclosure. An implementation of the present method is based on the abovementioned descriptive text generating model. As shown in FIG. 6, the method may comprise the following steps:

At 601, obtain the notional word and the first descriptive text of the notional word.

The notional word and the first descriptive text of the notional word obtained in the step are a text from which the second descriptive text with respect to the notional word is extracted.

At 602, input the notional word and the first descriptive text of the notional word into a descriptive text generating model, and obtain the second descriptive text output by the descriptive text generating model.

The second descriptive text can be obtained by inputting the notional word and the first descriptive text of the notional word into the descriptive text generating model obtained by pre-training according the process as shown in FIG. 2. The descriptive text generating model is implemented based on the seq2seq model.

An implementation principle is similar to the process of model training:

Input the first descriptive text of the notional word into the encoder of the seq2seq model, and obtain an implicit vector of the first descriptive text output by the encoder. Input the vector representation of the notional word, the implicit vector of the first descriptive text and the preset initial prediction word into the decoder of the seq2seq model so that the decoder cyclically predicts the prediction words at all time instants until the terminator is obtained, and form the second descriptive text from the prediction words at all time instants.

In the decoder, a context vector $c_{t-1}$ at a previous time instant, an implicit vector $s_{t-1}$ at the previous time instant and a prediction word $y_{t-1}$ at the previous time instant are used to perform processing of an attention mechanism to generate implicit vectors $s_t$ and $o_t$ at a current time instant, wherein the last implicit vector output by the encoder is regarded as an implicit vector at an initial time instant of the decoder. The initial prediction word may employ a preset word.

The vector representation $v_e$ of the notional word, the implicit vector $s_t$ generated at the current time instant and the implicit vector of the first descriptive text output by an encoding unit are used to obtain the context vector $c_t$ at the current time instant. Specifically, it is possible to use the vector representation $v_e$ of the notional word and the implicit vector $s_t$ generated by the decoder at the current time instant to generate a new implicit vector $s_{et}$ at the current time instant. Then it is feasible to use $s_{et}$ to perform the processing of the attention mechanism for the implicit vector of the first descriptive text output by the encoding unit.

It is feasible to use $o_t$ and $c_t$ to perform first normalized index function Softmax processing to obtain a first prediction probability distribution at the current time instant, and/or, use the attention mechanism to perform second Softmax processing to obtain a second prediction probability distribution at the current time instant. Upon performing the first softmax processing, $o_t$ and $c_t$ may be used to generate a probability distribution of words included by a predefined word list as the first prediction probability distribution at the current time instant. Upon performing the second Softmax processing, a result of the attention mechanism may be used to generate a probability distribution of words included by the first descriptive text as the second prediction word at the current time instant.

The first prediction probability distribution and/or second prediction probability distribution are used to obtain the prediction word $y_t$ at the current time instant.

If only one of the first Softmax and second Softmax is performed, the first prediction probability distribution or second prediction probability distribution obtained by performing the first Softmax or second Softmax may be used, and a word with a maximum probability value therein is directly regarded as the prediction word at the current time instant.

If the first Softmax and second Softmax are both performed, the prediction word at the current time instant may be determined in, but not limited to the following two manners:

The first manner: selecting one probability distribution from the first prediction probability distribution and second prediction probability distribution according to $s_t$, and selecting a word with a maximum probability value from the selected probability distribution as the prediction word $y_t$ at the current time instant.

The second manner is: combine the first prediction probability distribution and second prediction probability distribution to obtain a new probability distribution, and select a word with a maximum probability value from the new probability distribution as the prediction word $y_t$ at the current time instant.

Regarding specific implementations of the above two manners, please refer to detailed description in the embodiment as shown in FIG. 2, and no detailed description is presented here.

Prediction words at all time instants are obtained cyclically in turn until a preset terminator is obtained. The prediction words at all time instants obtained by prediction form the second descriptive text.

The above describes the method according to the present disclosure in detail. The apparatus according to the present disclosure is described below in detail in conjunction with embodiments.

Figure 7:
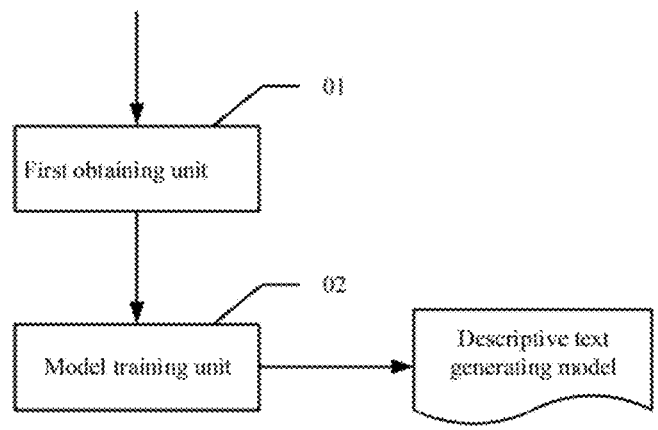
FIG. 7 is an apparatus for training a descriptive text generating model according to an embodiment of the present disclosure.

FIG. 7 is an apparatus for training a descriptive text generating model according to an embodiment of the present disclosure. As shown in FIG. 7, the apparatus may comprises: a first obtaining unit 01 and a model training unit 02. Main functions of the units are as follows:

The first obtaining unit 01 is configured to obtain training data. The training data comprise notional word, the first descriptive text and second descriptive text of the notional word, wherein the second descriptive text is a concise expression of the first descriptive text.

Specifically, the first obtaining unit 01 may regard an encyclopedia entry as an entity name; extract the second descriptive text of the entity name from an information box or a first sentence of the abstract of the encyclopedia webpage of the encyclopedia entry; use the extracted second descriptive text to extract, from a text of the encyclopedia webpage, a sentence that satisfies a preset coverage condition requirement with respect to the second descriptive text as the first descriptive text of the entity name.

The model training unit 02 is configured to regard the notional word and the first descriptive text of the notional word as input of a seq2seq model, regard the second descriptive text of the notional word as output of the seq2sequ model, and train the seq2seq model to obtain the descriptive text generating model.

Specifically, the model training unit 02 may input the first descriptive text of the notional word into the encoder of the seq2seq model, and obtain the implicit vector of the first descriptive text output by the encoder. In the encoder, words included by the first descriptive text of the notional word undergo processing of RNN, to obtain the implicit vector of the first descriptive text.

The model training unit 02 may input the vector representation of the notional word, the implicit vector of the first descriptive text and the preset initial prediction word into the decoder of the seq2seq model.

In the decoder, a context vector $c_{t-1}$ at a previous time instant, an implicit vector $s_{t-1}$ at the previous time instant and a prediction word $y_{t-1}$ at the previous time instant are used to generate an implicit vector $s_t$ and an output vector $o_t$ at a current time instant.

The vector representation $v_e$ of the notional word, the implicit vector $s_t$ generated at the current time instant and the implicit vector of the first descriptive text output by an encoding unit are used to perform processing of an attention mechanism to obtain the context vector $c_t$ at the current time instant. For example, it is possible to use the vector representation $v_e$ of the notional word and the implicit vector $s_t$ generated by the decoder at the current time instant to generate a new implicit vector $s_{et}$ at the current time instant, and use the $s_{et}$ to perform the processing of the attention mechanism for the implicit vector of the first descriptive text output by the encoding unit.

It is feasible to use $o_t$ and $c_t$ to perform first normalized index function Softmax processing to obtain a first prediction probability distribution at the current time instant, and/or, use the attention mechanism to perform second Softmax processing to obtain a second prediction probability distribution at the current time instant. For example, it is feasible to use $o_t$ and $c_t$ to select a word with a maximum probability from a predefined word list as a first prediction word at the current time instant. It is feasible to use the attention mechanism to select a word with a maximum probability from the first descriptive text as a second prediction word at the current time instant.

The first prediction probability distribution and/or second prediction probability distribution are used to obtain the prediction word $y_t$ at the current time instant.

If only one of the first Softmax and second Softmax is performed, the first prediction probability distribution or second prediction probability distribution obtained by performing the first Softmax or second Softmax may be used, and a word with a maximum probability value therein is directly regarded as the prediction word at the current time instant.

If the first Softmax and second Softmax are both performed, the prediction word at the current time instant may be determined in, but not limited to the following two manners:

The first manner: selecting one probability distribution from the first prediction probability distribution and second prediction probability distribution according to $s_t$, and selecting a word with a maximum probability value from the selected probability distribution as the prediction word $y_t$ at the current time instant.

The second manner is: combining the first prediction probability distribution and second prediction probability distribution to obtain a new probability distribution, and selecting a word with a maximum probability value from the new probability distribution as the prediction word $y_t$ at the current time instant.

Prediction words at all time instants are obtained cyclically in turn until a preset terminator is obtained. The prediction words at all time instants obtained by prediction form a prediction text corresponding to the first descriptive text. A training target of the seq2seq model is to minimize a difference between the prediction text corresponding to the first descriptive text and the corresponding second descriptive text in the sample.

Figure 8:
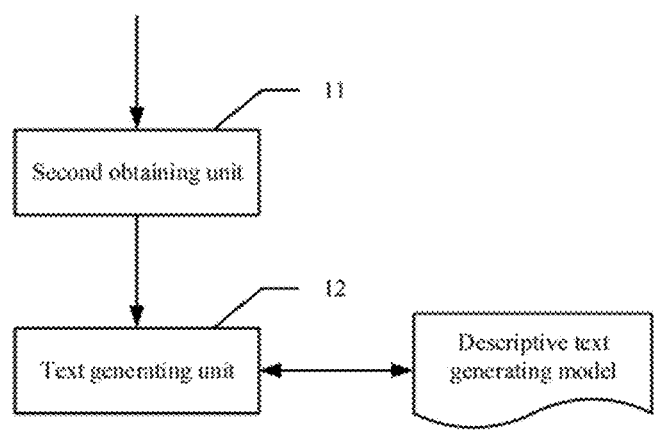
FIG. 8 is a structural diagram of the apparatus for automatically generating a descriptive text according to an embodiment of the present disclosure.

FIG. 8 is a structural diagram of the apparatus for automatically generating a descriptive text according to an embodiment of the present disclosure. An implementation of the apparatus is based on the descriptive text generating model pre-built by the apparatus shown in FIG. 7. As shown in FIG. 8, the apparatus may comprise: a second obtaining unit 11 and a text generating unit 12. Main functions of the units are as follows:

The second obtaining unit 11 is configured to obtain the notional word and the first descriptive text of the notional word.

The text generating unit 12 is configured to input the notional word and the first descriptive text of the notional word into a descriptive text generating model, and obtain the second descriptive text output by the descriptive text generating model.

The text generating unit 12 inputs the first descriptive text of the notional word into the encoder of the seq2seq model, and obtain an implicit vector of the first descriptive text output by the encoder, input the vector representation of the notional word, the implicit vector of the first descriptive text and the preset initial prediction word into the decoder of the seq2seq model so that the decoder cyclically predicts the prediction words at all time instants until the terminator is obtained, and form the second descriptive text from the prediction words at all time instants.

In the decoder, a context vector $c_{t-1}$ at a previous time instant, an implicit vector $s_{t-1}$ at the previous time instant and a prediction word $y_{t-1}$ at the previous time instant are used to generate an implicit vector $s_t$ and an output vector $o_t$ at a current time instant, wherein the last implicit vector output by the encoder is regarded as an implicit vector at an initial time instant of the decoder. The initial prediction word may employ a preset word.

The vector representation $v_e$ of the notional word, the implicit vector $s_t$ generated at the current time instant and the implicit vector of the first descriptive text output by an encoding unit are used to perform processing of an attention mechanism to obtain the context vector $c_t$ at the current time instant. Specifically, it is possible to use the vector representation $v_e$ of the notional word and the implicit vector $s_t$ generated by the decoder at the current time instant to generate a new implicit vector $s_{et}$ at the current time instant. Then it is feasible to use $s_t$ to perform the processing of the attention mechanism for the implicit vector of the first descriptive text output by the encoding unit.

It is feasible to use $o_t$ and $c_t$ to perform first normalized index function Softmax processing to obtain a first prediction probability distribution at the current time instant, and/or, use the attention mechanism to perform second Softmax processing to obtain a second prediction probability distribution at the current time instant. Upon performing the first softmax processing, $o_t$ and $c_t$ may be used to generate a probability distribution of words included by a predefined word list as the first prediction probability distribution at the current time instant. Upon performing the second Softmax processing, a result of the attention mechanism may be used to generate a probability distribution of words included by the first descriptive text as the second prediction probability distribution at the current time instant.

The first prediction probability distribution and/or second prediction probability distribution are used to obtain the prediction word $y_t$ at the current time instant.

If only one of the first Softmax and second Softmax is performed, the first prediction probability distribution or second prediction probability distribution obtained by performing the first Softmax or second Softmax may be used, and a word with a maximum probability value therein is directly regarded as the prediction word at the current time instant.

If the first Softmax and second Softmax are both performed, the prediction word at the current time instant may be determined in, but not limited to the following two manners:

The first manner: selecting one probability distribution from the first prediction probability distribution and second prediction probability distribution according to $s_t$, and selecting a word with a maximum probability value from the selected probability distribution as the prediction word $y_t$ at the current time instant.

The second manner is: combine the first prediction probability distribution and second prediction probability distribution to obtain a new probability distribution, and select a word with a maximum probability value from the new probability distribution as the prediction word $y_t$ at the current time instant.

Regarding specific implementations of the above two manners, please refer to detailed description in the embodiment as shown in FIG. 2, and no detailed description is presented here.

Prediction words at all time instants are obtained cyclically in turn until a preset terminator is obtained. The prediction words at all time instants obtained by text generating unit 12 form the second descriptive text.

The manner of automatically generating the descriptive text according to the above embodiment of the present disclosure may be applied to various application scenarios. The following several application scenarios are listed below:

Application Scenario 1

The second description text is extracted from the first descriptive text of the notional word. When the notional word is recommended and displayed in a search result page as a relevant entity of a certain query. The second descriptive text of the notational word may serve as a "bright spot" of the relevant entity, and displayed nearby (e.g., below) the relevant entity. The "bright spot" may be regarded as a reason why the relevant entity is recommended. The user may visually learn about the relevant entity through the "bright spot".

Application Scenario 2

If the query input by the user in the search engine is a notional word, it is possible to regard titles of relevant webpages in the search results as the first descriptive text, and input the query as a notional word into the descriptive text generating model, and display a generated second descriptive text nearby the relevant webpage in the search result page as a semantic extension of the relevant webpage.

In this way, the user can have a visual understanding of content of the relevant webpage to decide whether to click the relevant webpage and jump to a landing page for detailed browsing.

Application Scenario 3

It is feasible to pre-generate "entity bright spots" with respect to notional words in a knowledge base in the abovementioned manner according to the present disclosure. When the query input by the user is a notional word or includes a notional word, and the notional word might include several meaning, it is possible to obtain the vector representation of the context of the notional word, for example, the vector representation may be a vector representation corresponding to the context formed by a historical query sequence of the query, or may be a vector representation corresponding to the context formed by other words before and after the notional word included in the query. The context vector of the notional word represents performing similarity calculation with the vector representation of the "entity bright spot" of the corresponding identical notional word in the knowledge base, and determining, based on the similarity, a notional word in a knowledge mapping corresponding to the notional word, thereby helping the notional word in the query to perform auxiliary disambiguation.

Figure 9:
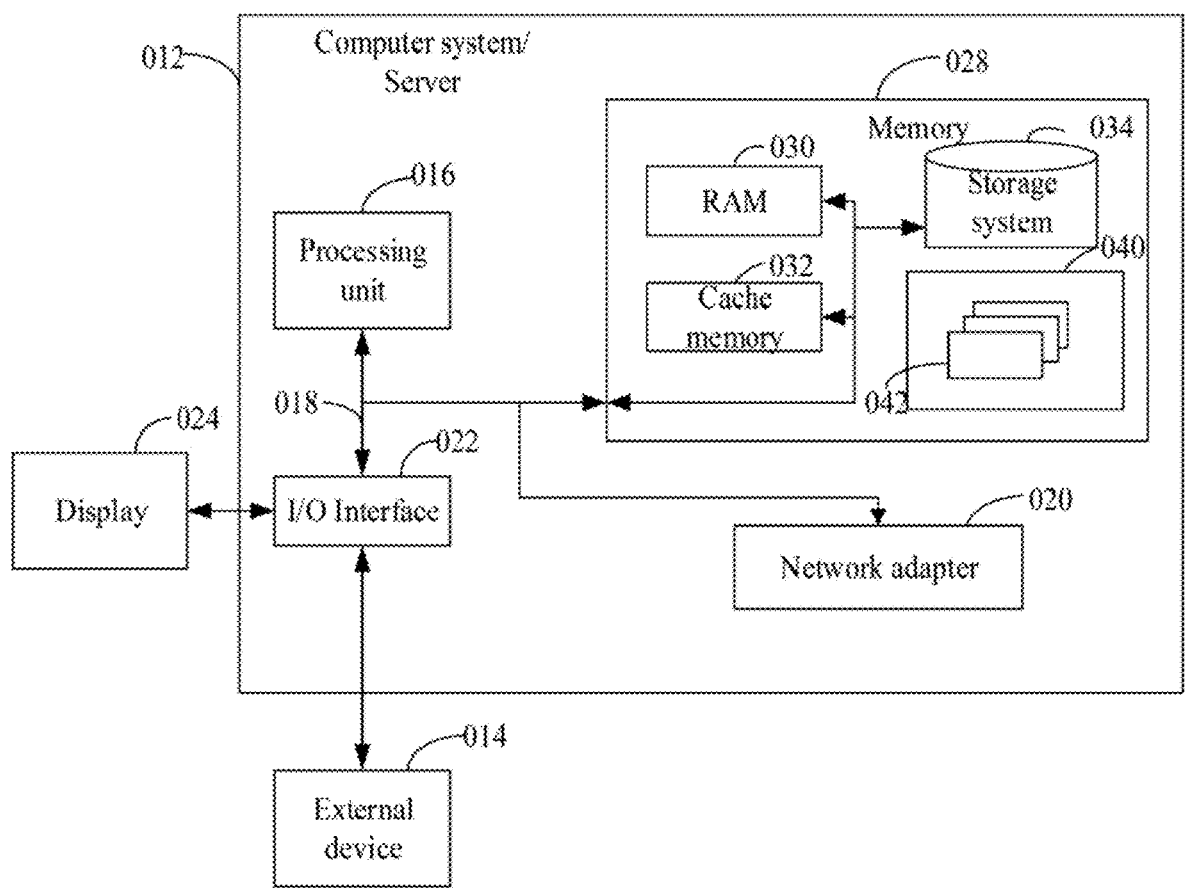
FIG. 9 is a block diagram of an example computer system/server adapted to implement an implementation mode of the present disclosure.

FIG. 9 illustrates a block diagram of an example computer system/server 012 adapted to implement an implementation mode of the present disclosure. The computer system/server 012 shown in FIG. 9 is only an example and should not bring about any limitation to the function and scope of use of the embodiments of the present disclosure.

As shown in FIG. 9, the computer system/server 012 is shown in the form of a general-purpose computing device. The components of computer system/server 012 may include, but are not limited to, one or more processors (processing units) 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 9 and typically called a "hard drive"). Although not shown in FIG. 9, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement steps of the method provided by embodiments of the present disclosure.

The above-mentioned computer program may be set in a computer storage medium, i.e., the computer storage medium is encoded with a computer program. When the program, executed by one or more computers, enables said one or more computers to execute steps of methods and/or operations of apparatuses as shown in the above embodiments of the present disclosure. For example, steps of the method executed by said one or more processors may be steps of the method in the embodiment shown in FIG. 3.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It can be seen from the above technical solutions that the method, apparatus, device and computer storage medium provided by the present disclosure may have the following advantages:

1) In the present disclosure, generation of the descriptive text is implemented based on the seq2seq model, the seq2seq model learns a generation manner of the second description text from the training data in a deep learning manner, and the descriptive text generating model obtained by training based on this manner can implement generation of the concise descriptive text with respect to the notional word in a deep understanding manner.

2) The present disclosure proposes an enhanced seq2seq model, fuses entity name information into the model to guide the decoding process so that the descriptive text generating model obtained from training better understands the core meaning of the first descriptive text, and generates the second descriptive text of the notional word based on this, so that the generated second descriptive text more precisely describes the notional word.

3) In the present disclosure, the attention mechanism, copying mechanism and the like are fused into the seq2seq model. It is proved through experiments that the enhanced seq2seq model according to the present disclosure is obviously better than the seq2seq model in the understanding effect of the first descriptive text, and improves validity of the generated second descriptive text.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method of training a descriptive text generating model, wherein the method comprises:
    obtaining training data, the training data comprising: a notional word, a first descriptive text and a second descriptive text of the notional word, wherein the second descriptive text is a concise expression of the first descriptive text;
    inputting the first descriptive text of the notional word into an encoder of the seq2seq model, and obtaining an implicit vector of the first descriptive text output by the encoder;
    inputting a vector representation of the notional word, the implicit vector of the first descriptive text and a preset initial prediction word into a decoder of the seq2seq model; and
    regarding the second descriptive text of the notional word as output of the seq2sequ model, and training the seq2seq model to obtain a descriptive text generating model,
    wherein the notional word is an entity name of an encyclopedia entry.

2. The method according to claim 1, wherein the obtaining the training data comprises:
    extracting the second descriptive text of the entity name from an information box or a first sentence of the abstract of an encyclopedia webpage of the encyclopedia entry;
    using the extracted second descriptive text to extract, from a text of the encyclopedia webpage, a sentence that satisfies a preset coverage condition requirement with respect to the second descriptive text as the first descriptive text of the entity name.

3. The method according to claim 2, wherein the extracting the second descriptive text of the entity name from an information box of an encyclopedia webpage of the encyclopedia entry comprises:
    extracting an attribute value from specific information attributes in the information box as the second descriptive text based on a preset rule.

4. The method according to claim 1, wherein in the encoder, words included by the first descriptive text of the notional word undergo processing of a bidirectional recurrent neural network RNN, to obtain the implicit vector of the first descriptive text.

5. The method according to claim 1, wherein in the decoder, use a context vector $c_{t-1}$ at a previous time instant, an implicit vector $s_{t-1}$ at the previous time instant and a prediction word $y_{t-1}$ at the previous time instant to generate an implicit vector $s_t$ and an output vector $o_t$ at a current time instant;
    use the vector representation $v_e$ of the notional word, the implicit vector $s_t$ generated at the current time instant and the implicit vector of the first descriptive text to perform processing of an attention mechanism to obtain a context vector $c_t$ at the current time instant;
    use the $o_t$ and the $c_t$ to perform first normalized index function Softmax processing to obtain a first prediction probability distribution at the current time instant, and/or, use the attention mechanism to perform second Softmax processing to obtain a second prediction probability distribution at the current time instant;

use the first prediction probability distribution and/or second prediction probability distribution to obtain a prediction word $y_t$ at the current time instant;

obtain prediction words at all time instants cyclically in turn until a preset terminator is obtained, the prediction words at all time instants obtained by prediction forming the second descriptive text.

6. The method according to claim 5, wherein the using the vector representation $v_e$ of the notional word, the implicit vector $s_t$ generated at the current time instant and the implicit vector of the first descriptive text to perform processing of an attention mechanism comprises:

using the vector representation $v_e$ of the notional word and the implicit vector $s_t$ generated by the decoder at the current time instant to generate a new implicit vector $s_{et}$ at the current time instant, and using the $s_{et}$ and the implicit vector of the first description text to perform the processing of the attention mechanism.

7. The method according to claim 5, wherein the using the $o_t$ and the $c_t$ to perform first normalized index function Softmax processing to obtain a first prediction probability distribution at the current time instant comprises:

using the $o_t$ and the $c_t$ to generate a probability distribution of words included by a predefined word list as the first prediction probability distribution at the current time instant.

8. The method according to claim 5, wherein the using the attention mechanism to perform second Softmax processing to obtain a second prediction probability distribution at the current time instant comprises:

using a result of the attention mechanism to generate a probability distribution of words included by the first descriptive text as the second prediction probability distribution at the current time instant.

9. The method according to claim 5, wherein the using the first prediction probability distribution and/or second prediction probability distribution to obtain a prediction word $y_t$ at the current time instant comprises:

selecting one probability distribution from the first prediction probability distribution and second prediction probability distribution according to the $s_t$, and selecting a word with a maximum probability value from the selected probability distribution as the prediction word $y_t$ at the current time instant; or, combining the first prediction probability distribution and second prediction probability distribution to obtain a new probability distribution, and selecting a word with a maximum probability value from the new probability distribution as the prediction word $y_t$ at the current time instant.

10. A method of automatically generating a descriptive text, wherein the method comprises:

obtaining a notional word and a first descriptive text of the notional word;

inputting the notional word and the first descriptive text of the notional word into a descriptive text generating model, and obtaining a second descriptive text output by the descriptive text generating model;

wherein the descriptive text generating model is obtained by a method of training the descriptive text generating model, comprising:

obtaining training data, the training data comprising: a notional word, a first descriptive text and a second descriptive text of the notional word, wherein the second descriptive text is a concise expression of the first descriptive text;

inputting the first descriptive text of the notional word into an encoder of the seq2seq model, and obtaining an implicit vector of the first descriptive text output by the encoder;

inputting a vector representation of the notional word, the implicit vector of the first descriptive text and a reset initial prediction word into a decoder of the seq2seq model; and regarding the second descriptive text of the notional word as output of the seq2sequ model, and training the seq2seq model to obtain a descriptive text generating model, wherein the notional word is an entity name of an encyclopedia entry.

11. The method according to claim 10, wherein the notional word, as a relevant entity of a query input into a search engine, is displayed in a search result page of the query, and the second descriptive text is displayed below the relevant entity.

12. A device, wherein the device comprises:

one or more processors;

a storage for storing one or more programs;

the one or more programs, when executed by said one or more processors, enable said one or more processors to implement a method of training a descriptive text generating model, wherein the method comprises:

obtaining training data, the training data comprising: a notional word, a first descriptive text and a second descriptive text of the notional word, wherein the second descriptive text is a concise expression of the first descriptive text;

inputting the first descriptive text of the notional word into an encoder of the seq2seq model, and obtaining an implicit vector of the first descriptive text output by the encoder;

inputting a vector representation of the notional word, the implicit vector of the first descriptive text and a preset initial prediction word into a decoder of the seq2seq model; and regarding the second descriptive text of the notional word as output of the seq2sequ model, and training the seq2seq model to obtain a descriptive text generating model, wherein the notional word is an entity name of an encyclopedia entry.

13. The device according to claim 12, wherein the obtaining the training data comprises:

extracting the second descriptive text of the entity name from an information box or a first sentence of the abstract of an encyclopedia webpage of the encyclopedia entry;

using the extracted second descriptive text to extract, from a text of the encyclopedia webpage, a sentence that satisfies a preset coverage condition requirement with respect to the second descriptive text as the first descriptive text of the entity name.

14. The device according to claim 13, wherein the extracting the second descriptive text of the entity name from an information box of an encyclopedia webpage of the encyclopedia entry comprises:

extracting an attribute value from specific information attributes in the information box as the second descriptive text based on a preset rule.

15. The device according to claim 12, wherein in the encoder, words included by the first descriptive text of the notional word undergo processing of a bidirectional recurrent neural network RNN, to obtain the implicit vector of the first descriptive text.

16. A device, wherein the device comprises:
one or more processors;
a storage for storing one or more programs;
the one or more programs, when executed by said one or more processors, enable said one or more processors to implement a method of automatically generating a descriptive text, wherein the method comprises:
obtaining a notional word and a first descriptive text of the notional word;
inputting the notional word and the first descriptive text of the notional word into a descriptive text generating model, and obtaining a second descriptive text output by the descriptive text generating model;
wherein the descriptive text generating model is obtained by a method of training the descriptive text generating model, comprising:
obtaining training data, the training data comprising: a notional word, a first descriptive text and a second descriptive text of the notional word, wherein the second descriptive text is a concise expression of the first descriptive text;
inputting the first descriptive text of the notional word into an encoder of the seq2seq model and obtaining an implicit vector of the first descriptive text output by the encoder;
inputting a vector representation of the notional word, the implicit vector of the first descriptive text and a preset initial prediction word into a decoder of the seq2seq model; and
regarding the second descriptive text of the notional word as output of the seq2sequ model, and training the seq2seq model to obtain a descriptive text generating model,
wherein the notional word is an entity name of encyclopedia entry.

17. A non-transitory storage medium including computer executable instructions, wherein the computer executable instructions, when executed by a computer processor, implement a method of training a descriptive text generating model, wherein the method comprises:
obtaining training data, the training data comprising: a notional word, a first descriptive text and a second descriptive text of the notional word, wherein the second descriptive text is a concise expression of the first descriptive text;
inputting the first descriptive text of the notional word into an encoder of the seq2seq model, and obtaining an implicit vector of the first descriptive text output by the encoder;
inputting a vector representation of the notional word, the implicit vector of the first descriptive text and a preset initial prediction word into a decoder of the seq2seq model; and
regarding the second descriptive text of the notional word as output of the seq2sequ model, and training the seq2seq model to obtain a descriptive text generating model,
wherein the notional word is an entity name of an encyclopedia entry.

18. A non-transitory storage medium including computer executable instructions, wherein the computer executable instructions, when executed by a computer processor, implement a method of automatically generating a descriptive text, wherein the method comprises:
obtaining a notional word and a first descriptive text of the notional word;
inputting the notional word and the first descriptive text of the notional word into a descriptive text generating model, and obtaining a second descriptive text output by the descriptive text generating model;
wherein the descriptive text generating model is obtained by a method of training the descriptive text generating model, comprising:
obtaining training data, the training data comprising: a notional word, a first descriptive text and a second descriptive text of the notional word, wherein the second descriptive text is a concise expression of the first descriptive text;
inputting the first descriptive text of the notional word into an encoder of the seq2seq model and obtaining an implicit vector of the first descriptive text output by the encoder;
inputting a vector representation of the notional word, the implicit vector of the first descriptive text and a preset initial prediction word into a decoder of the seq2seq model; and
regarding the second descriptive text of the notional word as output of the seq2sequ model, and training the seq2seq model to obtain a descriptive text generating model,
wherein the notional word is an entity name of encyclopedia entry.

* * * * *

UNITED STATES PATENT AND TRADEMARK OFFICE
CERTIFICATE OF CORRECTION

PATENT NO. : 11,157,698 B2  
APPLICATION NO. : 16/176783  
DATED : October 26, 2021  
INVENTOR(S) : Jizhou Huang et al.

Page 1 of 1

It is certified that error appears in the above-identified patent and that said Letters Patent is hereby corrected as shown below:

In the Claims

Column 20, Claim 10, Lines 10-11:
"and a reset initial prediction" should read: --and a preset initial prediction--

Column 21, Claim 16, Lime 28:
"of the seq2seq model and obtaining an" should read: --of the seq2seq model, and obtaining an--

Column 22, Claim 18, Line 37:
"of the seq2seq model and obtaining an" should read: --of the seq2seq model, and obtaining an--

Signed and Sealed this  
Eleventh Day of April, 2023

Katherine Kelly Vidal  
*Director of the United States Patent and Trademark Office*